United States Patent [19]

Caretta et al.

[11] Patent Number: 5,287,905
[45] Date of Patent: Feb. 22, 1994

[54] TREAD FOR A MOTOR VEHICLE TIRE

[75] Inventors: Renato Caretta, Gallarate; Gianfranco Colombo, Corcorezzo, both of Italy

[73] Assignee: Pirelli Coordinamento Pneumatici S.p.A., Milan, Italy

[21] Appl. No.: 699,389

[22] Filed: May 14, 1991

[30] Foreign Application Priority Data

May 14, 1990 [IT] Italy .................... 20284 A/90

[51] Int. Cl.⁵ .................................... B60C 11/11
[52] U.S. Cl. .................... 152/209 R; 152/DIG. 3
[58] Field of Search .......... 152/209 R, 209 D, 109 A, 152/DIG. 3; D12/146–148

[56] References Cited

U.S. PATENT DOCUMENTS

| | | | |
|---|---|---|---|
| D. 264,456 | 5/1982 | Ingley | D12/146 |
| D. 272,053 | 1/1984 | Candiliotis | D12/146 |
| D. 280,090 | 8/1985 | Graas | D12/146 |
| D. 299,711 | 2/1989 | Wallet | D12/147 |
| 4,055,209 | 10/1977 | Senger . | |
| 4,794,965 | 1/1989 | Langier . | |
| 4,815,512 | 3/1989 | Gerresheim et al. | 152/209 R |
| 4,823,855 | 4/1989 | Goergen et al. | 152/209 R |
| 4,884,606 | 12/1989 | Matsuda et al. . | |
| 5,062,461 | 11/1991 | Noguchi | 152/209 R |
| 5,137,068 | 8/1992 | Loidl et al. | 152/209 R |

FOREIGN PATENT DOCUMENTS

| | | | |
|---|---|---|---|
| 0330644 | 9/1989 | European Pat. Off. | 152/209 B |
| 0431853 | 6/1991 | European Pat. Off. . | |
| 0113607 | 5/1987 | Japan | 152/209 R |
| 0043803 | 2/1988 | Japan | 152/209 D |
| 0137003 | 6/1988 | Japan | 152/209 R |
| 0305009 | 12/1988 | Japan | 152/209 D |
| 0095912 | 4/1989 | Japan | 152/209 R |
| 0011404 | 1/1990 | Japan | 152/209 R |
| 2-127106 | 5/1990 | Japan | 152/209 R |

*Primary Examiner*—Michael W. Ball
*Assistant Examiner*—Nancy T. Krawczyk
*Attorney, Agent, or Firm*—Stevens, Davis, Miller & Mosher

[57] ABSTRACT

A tread for motor vehicle tires having circumferential grooves (3) and transverse grooves (4), a plurality of tread blocks (5, 6) circumferentially spaced apart to form two shoulder rows (5) and at least one central row (6) located between the shoulder rows. Each block (5, 6) is provided with one or more sipes or slits (11, 12) that are rectilinear and inclined with respect to the axis of rotation of the tire (2). The sipes (11, 12) of the blocks (5, 6) which constitute each of the shoulder and central rows are parallel to one another. The sipes (12) of the central rows (6) have an inclination, with respect to the axis of rotation, that is greater than the inclination of the sipes (11) of the blocks (6) which constitute the shoulder rows. This arrangement of the sipes (11, 12) substantially reduces the rolling noise of the tire.

16 Claims, 4 Drawing Sheets

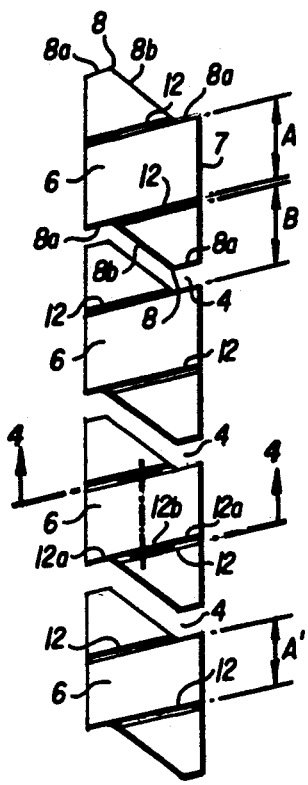
FIG. 3
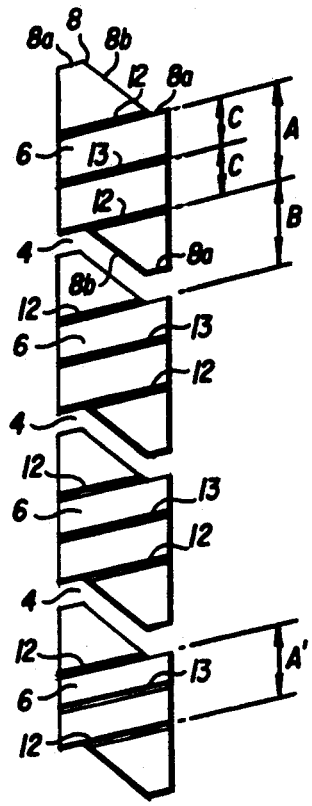
FIG. 5
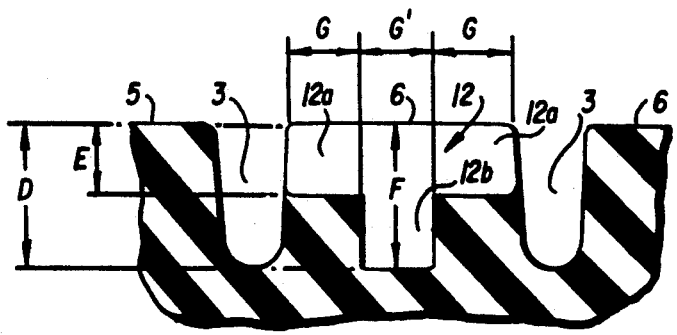
FIG. 4
FIG. 8
FIG. 9
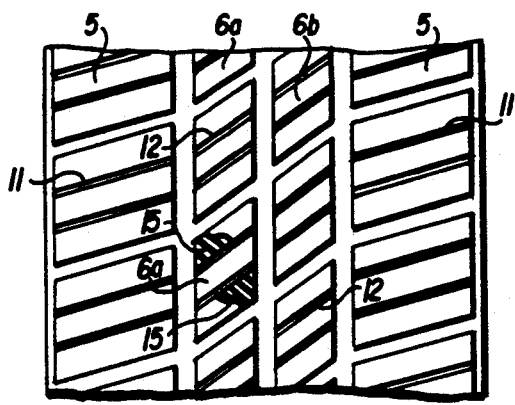
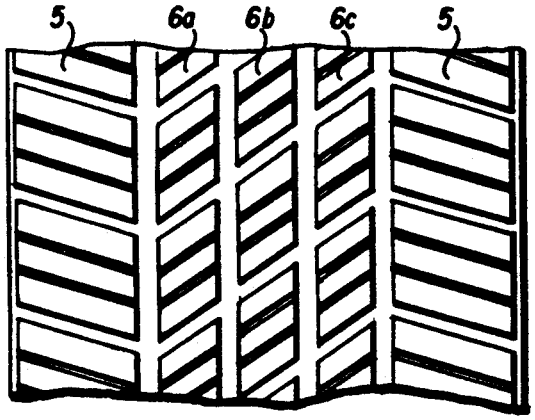

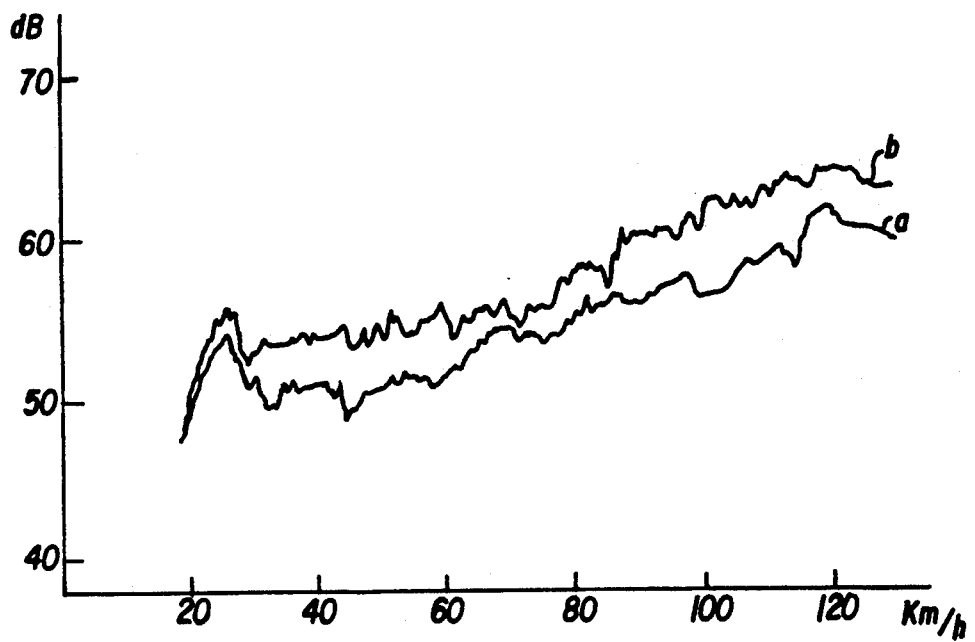
FIG. 6
FIG. 7
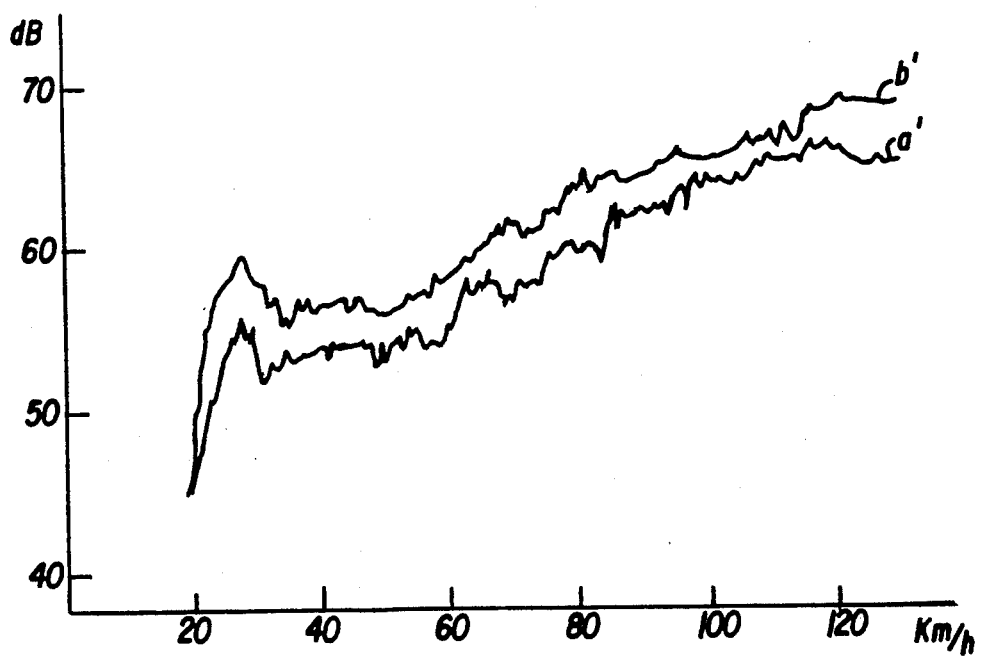

TREAD FOR A MOTOR VEHICLE TIRE

DESCRIPTION

The present invention relates to a tread for a motor vehicle tire, of the type having circumferential grooves and transverse grooves which define two rows of shoulder blocks, distributed along the respective opposite side edges of the tread, and one or more rows of central blocks, distributed between said rows of shoulder blocks, each of said blocks being provided with at least one sipe or slit, that is a groove of a very limited width.

The rolling surface or tread of tires for road vehicles is provided with a patterned outer surface for conferring to the tread certain desired characteristics, among them road-holding capability, both on dry terrains and on wet or snow-covered terrains, the elimination of water or of other materials collected on the road surface or on the tread surface, resistance to wear and so on.

To obtain the above performance the surface of the tread is in general provided with grooves having a direction with a component that is transverse to the circumference, defining portions of the tread, which on the whole have suitably designed dimensions, arrangement and contour, usually in the form of blocks and grooves arranged on one or more circumferential rows, equal to one another or not, to cover the overall axial width of the tread.

The geometrical configuration of the grooves is on each occasion selected and designed in relation to the characteristics of functional behavior to be conferred upon the tire, according to the type of use for which it is intended.

In this respect, the dimensions and the orientation of the grooves, upon which there also follows the geometrical configuration of the grooves, are designed so as to ensure an effective drainage of water in the areas of contact with the ground during operation on wet roads. At the same time, the geometrical configuration of the grooves is a determining factor for the purpose of road-holding capabilites, in particular as regards the generation of drift forces, that is, forces directed in a direction parallel to the tire's axis of rotation.

In a particularly widespread embodiment the tread blocks are distributed so as to form at least two rows of shoulder blocks, extending circumferentially along the opposite edges of the tread, and several rows of central blocks, located between the shoulder rows and arranged symmetrically with respect to the tire's equatorial plane.

The presence of blocks and grooves is, however, a source of noise and vibration during rolling, due to the periodic contact between the blocks and the ground, which can be irksome for the user.

With the object of limiting such noise and vibrations it is known that it is possible to make auxiliary incisions with a reduced width, in general not greater than one fifth of the width of the transverse grooves, commonly known as "sipes" to the technicians in the art, which enhance the deformability of the individual blocks, substantially reducing the intensity of the impacts and the sliding actions of the blocks on the ground in the area of contact.

Normally such sipes are oriented in a direction perpendicular to that in which the sliding actions which it is required to eliminate tend to occur. According to the individual case, the sipes can also communicate with the tread's transverse grooves by means of at least one of the extremities of the sipe.

The presence of such sipes, on the other hand, increases substantially the deformability of the tread in the presence of lateral drift forces, as is the case when driving on a curve and thus limits the applicability of "sets of sipes" in treads intended for high performance.

With a view to limiting such events the known art has used sipes having an orientation at a large angle to the direction of rolling of the tire, but reducing the effectiveness of the set of sipes, or it has used sipes having a curvilinear design, suitable for creating surfaces which come into contact with one another in the presence of drift forces, thus limiting the overall deformability of the tread.

The known treads thus represent a solution of compromise between the effectiveness in the reduction of the noise and rolling vibrations and the performance in terms of road-holding capability and accuracy of driving, especially on a dry road.

In this respect, it should be noted that the presence of the blocks on the tread always gives rise to a certain rolling noisiness due to the impact of the edges of the individual blocks on the ground during operation. This problem, until recently was of minor importance since the noisiness of the tire had a somewhat limited influence on the motor vehicle's overall noisiness. Now, with the appearance on the market of quieter motor vehicles thanks to the progress of aerodynamic and engine technologies, the rolling noisiness of tires assumes a substantial importance.

Thus, the main object of the present invention is substantially that of creating a tread which, thanks to a rational arrangement of the sipes or slits in the blocks, allows a considerable cutback of the rolling noisiness of the tire without penalizing its driving characteristics.

This object and still others, which shall appear more clearly during the course of the present description, are substantially attained by a tread for a motor vehicle tire, characterized in that the sipes of the central blocks extend in a rectilinear direction parallel to one another and according to an inclination, with respect to the direction normal to the rolling direction of the tire (that is, parallel to the axis of rotation), that is greater than the inclination of the sipes of the shoulder blocks.

Further characteristics and advantages shall appear more clearly from the detailed description of a preferred but not exclusive embodiment of a tread for a motor vehicle tire, according to the present invention, given hereinafter with reference to the enclosed drawings, provided purely as non-limiting examples, wherein:

FIG. 3 illustrates schematically a detail of FIG. 2, highlighting the geometrical characteristics of the blocks constituting the central rows;

FIG. 4 is a sectional view taken along the line IV—IV of FIG. 2 but showing only a portion of the axial width of the tire;

FIG. 5 is similar to FIG. 3 but shows a possible variant of the blocks constituting the central rows;

FIG. 6 is a diagram comparing the noisiness of a tire with a tread according to the present invention, in relation of the peripheral rolling speed, under both new and worn conditions;

FIG. 7 is a diagram comparing the noisiness of a tire with a tread having blocks that are the same as those of the tread of this invention but cut with sipes according to the known art, under both new and worn conditions;

FIG. 8 is a schematic representation of a tread design with sipes according to the invention, on blocks having a different outer contour, and with two rows of central blocks;

FIG. 9 is a tread with three rows of central blocks.

Figure 1:
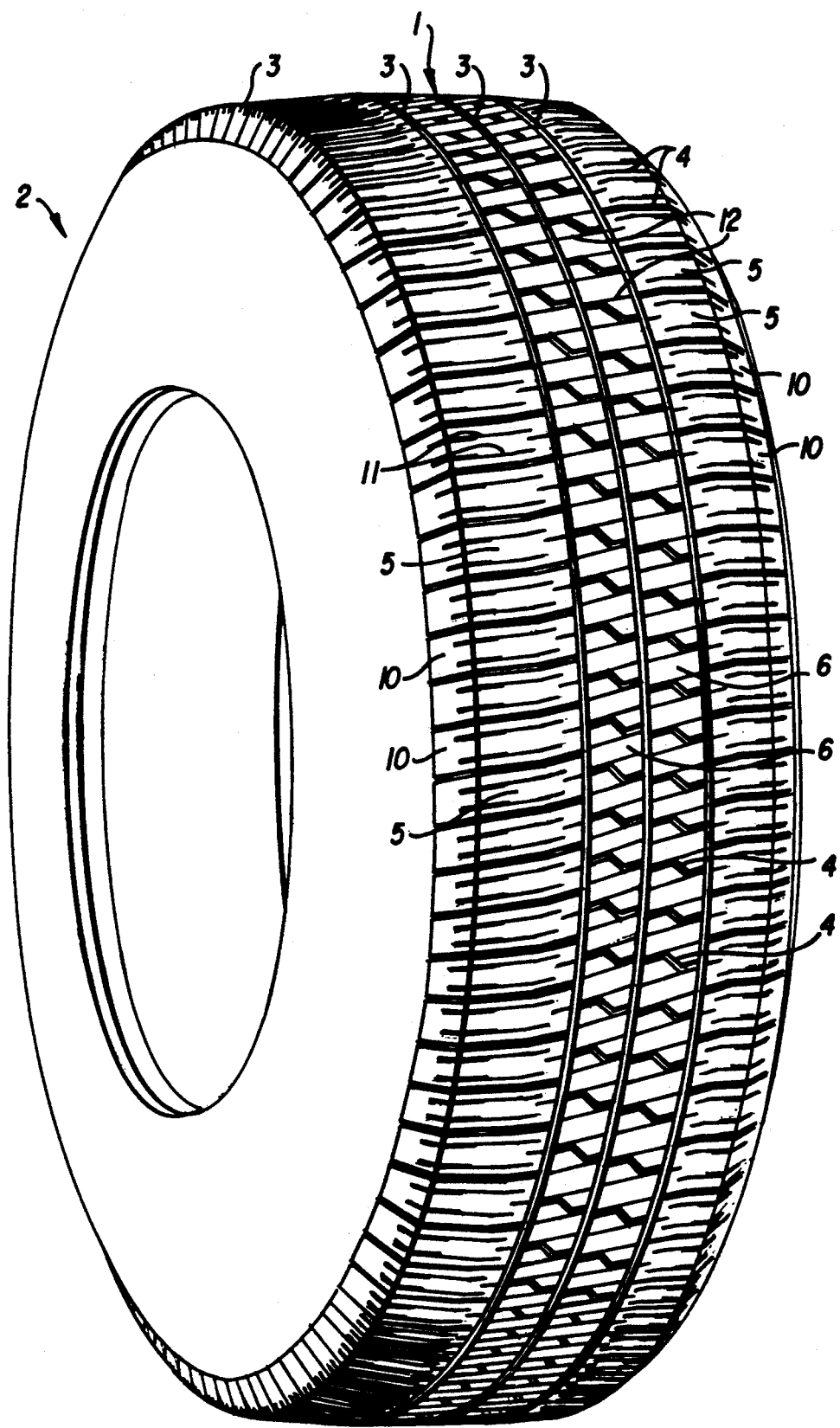
FIG. 1 is a perspective view illustrating a tire provided with a tread according to the present invention.
Figure 2:
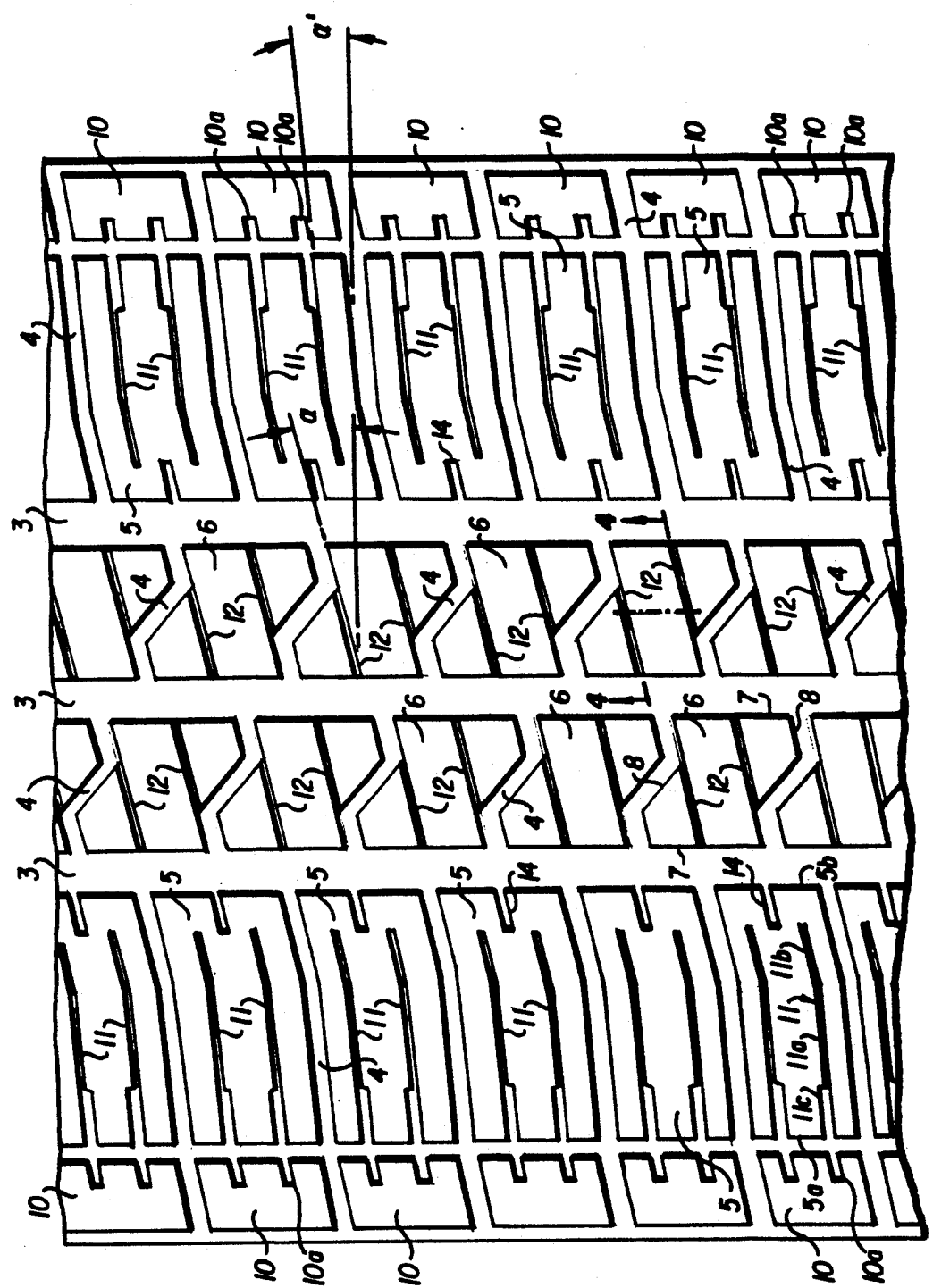
FIG. 2 is a partial circumferential enlarged view of the tread of FIG. 1.

With particular reference to FIGS. 1 and 2, reference numeral 1 indicates a tread for a motor vehicle tire, according to the present invention.

In a known and conventional manner, the tread 1 is applied circumferentially onto the crown of a motor vehicle tire 2, which is not described in detail in that it is known and conventional in itself. The tread 1 defines the rolling surface of the tire and is in general designed to ensure good adhesion to the road surface, as regards both tractivity and road-holding capability, and to ensure, in case of operation on a wet surface, an effective elimination of water between tire and road surface.

For this purpose, the tread 1 is conventionally provided with a plurality of circumferential grooves 3 and with transverse grooves 4 suitably shaped and intersecting the circumferential grooves.

The combination between the circumferential grooves 3 and the transverse grooves 4 gives rise to a pair of rows of shoulder blocks 5, arranged along the respective opposite (axial outer) lateral edges of the tread 1, and to one or more rows of central blocks distributed between the rows of shoulder blocks and shaped differently with respect to the latter.

More in particular, as is shown in FIG. 2, the shoulder blocks 5 are to have a substantially parallelepiped configuration in plan view. The central blocks 6, on the other hand, each have in plan view, along its circumferential length, a pair of longitudinal sides 7, defined by the circumferential grooves 3, oriented substantially along the direction of rolling of the tire 2 and a pair of transverse sides 8, defined by the transverse grooves 4, oriented transversely to said direction of rolling.

Such transverse sides, in the illustrated embodiment, each have two parallel lateral segments 8a (see FIG. 3), between which there extends an intermediate segment 8b oriented to form an obtuse angle with the lateral segments themselves. Conveniently, the lateral segments 8a each have an inclination, with respect to the direction normal to the direction of rolling, that is less than that of the intermediate segment 8b.

Along the outer edges of the tread 1 there is optionally provided a pair of rows of auxiliary blocks 10 one on each axial outer edge and each having a parallelepiped shape, side by side with the shoulder blocks 5.

The shoulder blocks 5 and the central blocks 6 are provided with respective auxiliary incisions 11, 12, called "sipes" or "slits", each said sipe or slit having limited width.

The width of such sipes is preferably restricted to the minimum value that can be cut with the dies that are used and preferably is not greater than one fifth of the width of the transverse grooves 4 or, as an alternative, not greater than 1.5 mm.

In a manner similar to what can be observed in treads of a known type, these sipes 11, 12 perform the task of enhancing the elastic deformability of the blocks 5, 6 in certain directions, to restrict their sliding action on the road surface during operations, so as to limit the overall noisiness of the tire 2.

More in particular, provision is made in this respect for the sipes 11, 12 belonging to the shoulder blocks 5 and to the central blocks 6, respectively, to extend in a substantially rectilinear direction parallel to one another, according to a pre-determined inclination with respect to the direction normal to the direction of rolling of the tire 2 (that is, parallel to the axis of the rotation). More accurately, the sipes 12 in the central blocks 6 extend along the entire axial width of the corresponding blocks, and their inclination, indicated by the angle "α" in FIG. 2, is greater than the inclination "α'" of the sipes 11 in the shoulder blocks 5. Preferably, the angle of inclination "α" of the sipes 11 has a value ranging from 10° to 35°. In the illustrated example, the angle "α" is equal to about 12°.

As one may observe from FIG. 2, each of the central blocks 6 is traversed by a pair of sipes 12 each of which extends in alignment with one of the lateral segments 8a on the corresponding transverse side 8. The sipes 12 of each of the central blocks 6 are distanced one from the other according to a maximum amount, indicated with "A" in FIG. 3, equal to the distance "B" between two of the opposite lateral segments 8a belonging respectively to two adjacent central blocks 6.

In the variant illustrated in FIG. 5, in the case of blocks having a substantial extension in the circumferential direction, provision is made for each of the central blocks 6 to be traversed by a third sipe 13, parallel to and at an equal distance from the sipe 12 arranged in alignment with the lateral segments 8a.

In this case, the sipes 12 and 13 are spaced one from the other by a distance "C" preferably not less than three fifths of the distance "B".

Preferably, as clearly highlighted by FIG. 4, each of the sipes 12, 13 in the central blocks 6 has two lateral portions 12a with a depth "E" ranging from one third to two thirds (in the case illustrated equal to one half) of the depth "D" of the circumferential grooves 3, as well as a middle portion 12b having a depth "F" substantially equal to the depth "D" of the circumferential grooves 3. As can easily be observed from FIG. 4, the lateral portions 12a have a width "G" substantially equal to the width "G'" of the central portion 12b.

Now with particular reference to the shoulder blocks 5, it is contemplated that each of them be equipped with at least one sipe 11 (two in the example illustrated) whose inclination "α'" with respect to the direction normal to the direction of rolling of the tire 2 is less than that of the sipes of the central blocks and ranges from 4° to 15°. In the case illustrated, the angle "α'" is equal to about 12°. In the case illustrated, each sipe 11 extends from an axial external side 5a of the respective shoulder block 5 up to the proximity of the opposite internal side 5b of the same block.

More in particular, in the case illustrated, (see FIG. 2, lower left corner) each sipe 11 has a main rectilinear section 11a which extends from the external side 5a of the respective shoulder block 5, according to an angle of 4.5° with respect to the direction normal to the direction of rolling of the tire 2, followed by a terminal rectilinear section 11b, slightly at an angle to the main section and extending up to the proximity of the internal side 5b of the shoulder block 5. Preferably, the terminal section 11b of each sipe 11 extends in a direction parallel to and aligned with at least one of the sipes 12 belonging to the central blocks 6.

It is also preferable that, in the presence of grooves 11c in the shoulder blocks, the sipes 11 be arranged along the extension of same, so that the grooves 11c constitute an extended portion of the sipes 11a.

Each shoulder block 5 can also be provided with a blind auxiliary sipe or groove 14 extending from the axial internal side 5b of the block itself in a position intermediate between the terminal sections 11b of the sipe 11 and having a width that is substantially equal to that of the sipe portions 11c.

As an alternative the sipes 11 can extend in a perfectly rectilinear direction, and can go right through the respective shoulder blocks 5; if the block has sufficient circumferential length the auxiliary sipe or groove 14 can remain, otherwise it is omitted.

With the object of restricting the rolling noise of the tire 2 it is also provided that the distance between the sipes 11, 12 of each block 5, 6 be subject to variation in the circumferential length of the tread 1. This characteristic is clearly visible when comparing the distances "A" and "A'" between the central blocks 6 represented in FIG. 3. Preferably, the variation of the distance "A", "A'" is limited to a range between a maximum value and a minimum value equal to four fifths of the maximum value. Thus the generation of a harmonic noise can be prevented by making some of the blocks circumferentially longer than others so as to provide a "break" in the regularity of the tread pattern.

It has been observed that the technical solutions adopted in the positioning of the sipes 11, 12 according to the invention allow a substantial reduction in the rolling noise of the tire 2.

In this respect, FIGS. 6 and 7 show two comparison diagrams which have been obtained by measuring, at different operating speed, the rolling noise of a tire equipped with a tread according to the invention and of another tire whose tread has the same characteristics in relation to the geometrical configuration of the longitudinal grooves 3 and transverse grooves 4, respectively, but has a different arrangement of the sipes.

After measuring the noise of tires with new (unworn) treads, curves indicated with "a" and "a'", respectively, in FIGS. 6 and 7 have been plotted. By measuring, on the other hand, the noise of tires with a worn tread after covering about 10,000 km, the curves indicated with "b" and "b'" have been obtained.

As can easily be observed, the curve "b" of the tire provided with the tread of the present invention produces a maximum noisiness which, even after covering a distance of 10,000 km, is less than that produced by the curve "a'" of the tire with a new conventional tread.

The invention thus attains the proposed objectives.

In fact, the arrangement and the geometrical configuration of the sipes of the present tread achieves an appreciable reduction in the rolling noisiness of the tire, without, on the other hand, penalizing performance.

In FIGS. 8, 9 there are illustrated two alternative embodiments of tire treads according to the invention, wherein the circumferential profile of the blocks of the central rows is shown generically; in such embodiments the sipes are oriented in a direction parallel to the transverse sides.

In the case wherein the transverse sides of the blocks have a varying profile, constituted by more than one side portion, the secondary grooves are preferably arranged in a direction parallel to one or more of the portions of the transverse sides of the blocks that have the lesser inclination with respect to the tire axis of rotation.

Such side portions in fact normally make a contribution to noisiness and to the so-called "roughness" of operation that is prevalent with respect to the side portions having a greater inclination.

More in general, according to the spirit of the present invention, in the case wherein such portions having a lesser inclination have an extension that is significantly lower than the other portions of the transverse sides, so that it is the latter which makes the greatest contribution to noisiness, the sipes shall in any case be parallel to those portions of the transverse sides responsible for the greatest rolling resistance.

It can be seen that the profile of the blocks of FIG. 2 is a particular case of the blocks of FIGS. 8, 9: in fact the profile of the central blocks of FIG. 2 can be obtained by eliminating from the generic envelopment contour of a central block 6a represented in FIG. 8 the dotted portions 15, as indicated in that figure.

As shown by FIG. 8, there can be two rows of central blocks, 6a, 6b, in combination with the shoulder blocks 5; there is shown in FIG. 9 a different embodiment, comprising three rows of central blocks, 6a, 6b, 6c.

The central blocks can all have sipes with the same general inclination to the rotational axis and with the same general inclination as that of the shoulder blocks, according to the diagram of FIG. 8, or inclinations other than those of the shoulder blocks, as represented in FIG. 9; according to the tire's usage characteristics, it is also possible, within the scope of the present invention, to have tread designs of the directional type, that is that are a mirror-image of them with respect to the mid-circumferential plane of the tire and with inclinations of the opposite sign for the transverse sides corresponding to the central and shoulder blocks, or mixed, that is with variations in the sign of the angle of inclination of the transverse sides of the blocks (and, as a consequence, of the angle of the corresponding secondary grooves) for each row of central and shoulder blocks.

Several changes and variants can be made to the invention conceived in this way, all falling within the scope of the inventive concept that characterizes it and as defined by the appended claims.

We claim:

1. A tire for a motor vehicle wheel comprising a tread pattern having
    a plurality of axially extending transverse grooves;
    at least two circumferential straight grooves dividing the axial width of the tread into at least two circumferentially extending axially outer rows of circumferentially spaced apart substantially identically shaped shoulder blocks of substantially parallelepiped configuration and
    at least one central row of blocks having a plurality of circumferentially spaced apart substantially identically shaped central blocks, all of the blocks of any row of said at least one central row being circumferentially aligned with each other between two of said at least two circumferential straight grooves and each of said rows being so aligned within that row,
    each of said central blocks, along its circumferential length, having a pair of longitudinal sides, oriented substantially along the direction of rolling of the tire and a pair of transverse sides oriented transversely to the direction of rolling, each transverse side having two parallel lateral segments between which there extends an intermediate segment oriented to form an obtuse angle with the lateral segments, said lateral segments having an inclination, with respect to the axis of rotation that is less than the inclination of the intermediate segment, each of the central blocks being traversed by at least one pair of parallel sipes, each of which extends in alignment with one of the lateral segments of one of the transverse sides, each of said shoulder and central blocks having at least one generally axially extending sipe having a width not greater than one fifth of a width of said transverse grooves, said sipes in the shoulder blocks being at a first angle to the rotational axis of the tire, said sipes of the central blocks lying at a second angle of inclination with respect to the rotational axis of the tire that is greater than said first angle.

2. The tire of claim 1, in which each of the central blocks of the tread is traversed by a third sipe positioned substantially equidistance between and parallel to the sipes which are arranged in alignment with said lateral segments.

3. The tire of claim 1, in which the sipes of the central blocks of the tread are inclined with respect to the rotational axis of the tire at an angle $\alpha$ ranging from 10° to 35°.

4. The tire of claim 1, in which the sipes of the shoulder blocks of the tread are inclined with respect to the rotational axis of the tire at an angle $\alpha$ ranging from 4° to 15°.

5. The tire of claim 1, in which the sipes of the shoulder blocks of the tread extend each from an axial outer side of the respective block at least up to the proximity of the opposite axially internal side of the same block.

6. The tire tread of claim 1, in which each of the sipes of the shoulder blocks of the tread has a main rectilinear section which extends from an axially external side of the corresponding block and a terminal rectilinear section, slightly at an angle to the main section, which extends up to the proximity of an axially internal side of said block.

7. The tire of claim 6, in which said terminal rectilinear section extends in a direction parallel to and aligned with at least one of the sipes of the central blocks.

8. The tire of claim 1, in which the sipes of the shoulder blocks of the tread extend axially across along the entire width of the respective blocks.

9. The tire of claim 5, in which each of the sipes of the shoulder blocks of the tread has a main section, a terminal section and an axially outer portion of extremity having a width equal to at least twice the width of the sipe at said main section and terminal section.

10. The tire of claim 1, in which each of the sipes of the central blocks of the tread has two side portions with a depth ranging from one third to two thirds of the depth of the circumferential grooves, and a middle portion having a depth substantially equal to the depth of said circumferential grooves.

11. The tire of claim 10, in which said side portions have a depth substantially equal to half the depth of said central portion.

12. The tire of claim 10, in which said side portions and said central portion have substantially the same width.

13. The tire of claim 1, in which the sipes of each block of the tread are at distance one from the other according to a measurement (A, A') which ranges from a maximum value (A) to a minimum value (A') equal to four fifths of the maximum value (A).

14. The tire of claim 1, in which the sipes of each of the central blocks of the tread are at distance one from the other according to a maximum measurement (A) equal to the distance (B) between two of said opposite lateral segments of two adjacent blocks, respectively.

15. The tire tread of claim 1, in which at least the sipes of the central blocks of the tread are parallel to a side transverse to the rolling direction of the tire, or to the portion of such side having a lesser inclination with respect to the axis of rotation of the tire.

16. The tire of claim 1, in which each of the central blocks of the tread is traversed by two parallel sipes and a third sipe positioned substantially equidistance between and parallel to said sipes.

* * * * *